E. H. NIED.
LOCK.
APPLICATION FILED JUNE 28, 1919.
1,328,186.
Patented Jan. 13, 1920.
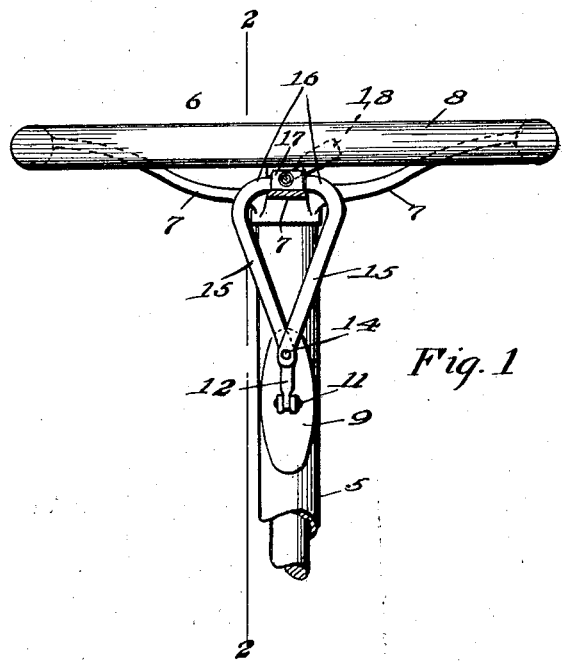
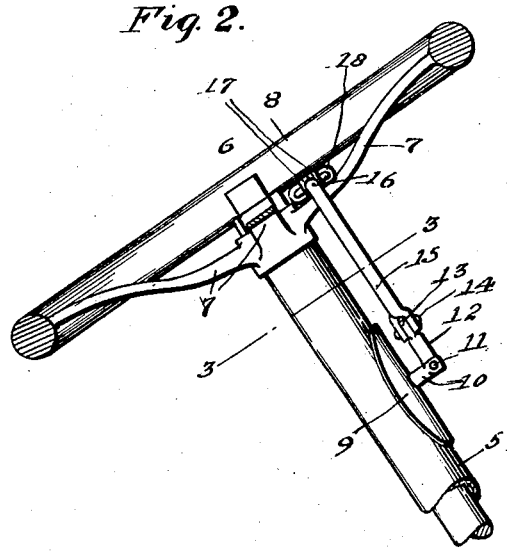
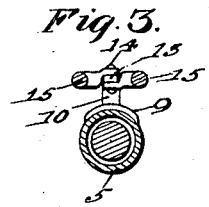
WITNESS:
R. A. Thomas
INVENTOR.
Edward H. Nied.
BY
Victor J. Evans
ATTORNEY.

UNITED STATES PATENT OFFICE.

EDWARD H. NIED, OF AKRON, OHIO.

LOCK.

1,328,186.　　　Specification of Letters Patent.　　Patented Jan. 13, 1920.

Application filed June 28, 1919. Serial No. 307,441.

*To all whom it may concern:*

Be it known that I, EDWARD H. NIED, a citizen of the United States, residing at Akron, in the county of Summit and State of Ohio, have invented new and useful Improvements in Locks, of which the following is a specification.

This invention has reference to a means for locking the steering wheel of an automobile to prevent the operation thereof and consequently prevent the use of the machine by unauthorized persons.

An object of the invention is to produce a simple means secured to the column of the steering post having elements designed to engage with one of the spokes or arms of the steering wheel to lock the steering wheel against turning.

A further object of the invention is to produce a device of this character which may be readily attached to the steering post of any ordinary construction of automobiles, which may be readily brought to a locking position with respect to the steering wheel or as readily brought to unlocking position with respect to the said wheel.

Other objects and advantages will present themselves as the nature of the invention is better understood, reference being had to the accompanying drawings, in which:

Figure 1 is a view illustrating the application of the improvement.

Fig. 2 is a sectional view approximately on the line 2—2 of Fig. 1.

Fig. 3 is a sectional view approximately on the line 3—3 of Fig. 2.

Referring now to the drawings in detail, the numeral 5 designates the steering post column of any ordinary construction of automobiles and the numeral 6 designates the steering wheel. The steering wheel is also of the ordinary construction, having arms or spokes 7 radiating from its hub to the rim 8 thereof.

On the column 5, at a suitable distance below the steering wheel 6 I secure a plate 9. The plate may be braced to the post, riveted thereto or clamped thereon, but in any event the securing means holds the post against movement in any direction and sustains the plate as an integral part of the post. The plate is provided with an outstanding arm 10, and to the outer end of this arm is pivoted, as at 11, a link 12. The link 12 has its outer end reduced so as to be centrally provided with an outstanding ear 13 that is disposed transversely with respect to the longitudinal plane of the arm 10. Pivotally secured to the opposite sides of the ear, as at 14, are jaw members 15—15. The jaw members are preferably constructed each from a single piece of suitable metal which may be round in cross section, and the outer ends of the said members are extended angularly toward each other as indicated by the numerals 16. These angle portions have their ends reduced from one of the sides thereof providing tongues 17 which are designed to lap, the said tongues having alining openings through which passes the shackle of a pad lock 18. The key of the pad lock is, of course, retained in the possession of the owner of the machine, and in bringing the device to operative position it is merely necessary to spread the jaws 15 away from each other, swing the same with the link 12 on the pivot 11 in the direction of the steering wheel, bring the offset end 16 of the said jaws around the spokes 7 of the steering wheel, and thereafter apply the pad lock. When the pad lock is removed the jaws will spring downwardly of the post and contact therewith so as to be entirely out of the way of the operator of the machine.

From the foregoing description, when taken in connection with the drawings, the simplicity of the construction and the advantages thereof will be readily apparent without further detailed description.

Having thus described the invention, what is claimed as new, is:—

In combination with the steering column and the steering wheel connected to the steering post of an automobile, of means for locking the steering wheel against turning on the column, comprising a plate secured to the column below the wheel, an outstanding arm on said plate, a link pivotally connected to said arm, jaws pivotally connected to the link, each of said jaws having its outer end extended inwardly toward each other and reduced to provide tongues which are adapted to lap when the jaws are brought together, said tongues having openings therethrough, the said jaws designed to receive one of the spokes of the steering wheel, and a locking device designed to be received in the openings of the jaws.

In testimony whereof I affix my signature.

EDWARD H. NIED.